United States Patent
Anderson, Sr. et al.

(10) Patent No.: US 8,484,258 B2
(45) Date of Patent: *Jul. 9, 2013

(54) CONCURRENT DIRECTORY UPDATE IN A CLUSTER FILE SYSTEM

(75) Inventors: Owen T. Anderson, Sr., St Thomas, VI (US); Frank B. Schmuck, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/412,569

(22) Filed: Mar. 5, 2012

(65) Prior Publication Data
US 2012/0166499 A1 Jun. 28, 2012

Related U.S. Application Data

(63) Continuation of application No. 11/776,092, filed on Jul. 11, 2007, now Pat. No. 8,156,164.

(51) Int. Cl.
*G06F 17/30* (2006.01)
(52) U.S. Cl.
USPC ............. 707/822; 707/823; 707/E17.005; 707/E17.01
(58) Field of Classification Search
USPC .......... 707/823, 822, 999.2, E17.005, E17.01
See application file for complete search history.

(56) References Cited

U.S. PATENT DOCUMENTS

| | | | |
|---|---|---|---|
| 5,151,989 A * | 9/1992 | Johnson et al. ................ 1/1 |
| 5,535,375 A * | 7/1996 | Eshel et al. ................ 703/27 |
| 5,893,086 A | 4/1999 | Schmuck et al. |
| 5,940,838 A | 8/1999 | Schmuck et al. |
| 5,950,199 A | 9/1999 | Schmuck et al. |
| 5,950,205 A * | 9/1999 | Aviani, Jr. ................ 1/1 |
| 5,963,963 A | 10/1999 | Schmuck et al. |
| 5,974,424 A | 10/1999 | Schmuck et al. |
| 5,987,477 A | 11/1999 | Schmuck et al. |
| 5,999,976 A | 12/1999 | Schmuck et al. |
| 6,021,508 A | 2/2000 | Schmuck et al. |
| 6,023,706 A | 2/2000 | Schmuck et al. |
| 6,032,216 A | 2/2000 | Schmuck et al. |

(Continued)

FOREIGN PATENT DOCUMENTS

| | | |
|---|---|---|
| EP | 0890914 | 1/1999 |
| EP | 1246061 | 10/2002 |

OTHER PUBLICATIONS

Office Action, U.S. Appl. No. 11/776,092, filed Jul. 11, 2007, Anderson et al, mailing date Aug. 6, 2009, 16 pages.

(Continued)

*Primary Examiner* — Mahesh Dwivedi
*Assistant Examiner* — Shiow-Jy Fan
(74) *Attorney, Agent, or Firm* — Matthew W. Baca; Amy J. Pattillo

(57) ABSTRACT

A method for avoiding directory conflicts across a file system having multiple nodes with one node representing a token manager. For each directory, at least one metanode responsible for directory updates. The method involving obtaining a name-based lock on a filename. Querying the token manager for a lock token. If a new token is obtained, sending a Remote Procedure Call (RPC) to the metanode to obtain matching directory entries, and caching the result of the RPC so that subsequent operations on that filename can be satisfied without additional messages sent to the metanode. Updating a cached directory block in memory by creating a new directory entry in the block or deleting an existing directory entry from the block. Information regarding the updating is sent to the metanode on one of: periodic schedule, a subsequent synchronization event, or when the name-based lock token is revoked.

10 Claims, 4 Drawing Sheets

U.S. PATENT DOCUMENTS

| | | | |
|---|---|---|---|
| 6,192,408 | B1 | 2/2001 | Vahalia et al. |
| 6,324,581 | B1 | 11/2001 | Xu et al. |
| 6,385,701 | B1 * | 5/2002 | Krein et al. .................. 711/141 |
| 6,954,881 | B1 | 10/2005 | Flynn Jr. et al. |
| 6,973,455 | B1 | 12/2005 | Vahalia et al. |
| 7,010,554 | B2 | 3/2006 | Jiang et al. |
| 7,120,631 | B1 | 10/2006 | Vahalia et al. |
| 7,120,650 | B2 | 10/2006 | Loy et al. |
| 7,216,135 | B2 | 5/2007 | Sawdon et al. |
| 7,281,050 | B2 | 10/2007 | Dinker et al. |
| 7,418,465 | B1 | 8/2008 | Lewis et al. |
| 2004/0133607 | A1 * | 7/2004 | Miloushev et al. ........... 707/200 |
| 2004/0162885 | A1 | 8/2004 | Garg et al. |
| 2007/0050377 | A1 | 3/2007 | Srivastava |
| 2007/0055702 | A1 | 3/2007 | Fridella et al. |
| 2007/0112771 | A1 | 5/2007 | Maybee et al. |
| 2009/0019047 | A1 | 1/2009 | Anderson |

OTHER PUBLICATIONS

Final Office Action, U.S. Appl. No. 11/776,092, filed Jul. 11, 2007, Anderson et al, mailing date Mar. 8, 2010, 18 pages.

Office Action, U.S. Appl. No. 11/776,092, filed Jul. 11, 2007, Anderson et al, mailing date Jun. 29, 2011, 14 pages.

Notice of Allowance, U.S. Appl. No. 11/776,092, filed Jul. 11, 2007, Anderson et al, mailing dateDec. 6, 2011, 5 pages.

Author: Frank Schmuck and Roger Haskin; Title: GPFS: A Shared-Disk File System for Large Computing Clusters; Date: Jan. 28-30, 2002; Proceedings of the Conference on File and Storage Technologies (Fast'02), Jan. 28-30, 2002, Monterey, CA, pp. 231-244. (USENIX, Berkeley CA.).

Mohindra, et al., "Distributed Token Management in Calypso File System", ISBN: 978-0-8186-6427-4, XP010100174, pp. 290-297, Oct. 26, 1994.

Thekkath, et al., "Frangipani: A Scalable Distributed File System," Operating Systems Review, AC, New York, vol. 31, No. 5, Dec. 12, 2001, pp. 224-237, XP000771034, ISSN: 0163-5980.

International Search Report dated Dec. 22, 2008 for PCT/EP2008/058187.

Examiner Search Report, U.S. Appl. No. 11/776,092, Google Scholar, 14 pages, dated Dec. 6, 2011.

* cited by examiner

CONCURRENT DIRECTORY UPDATE IN A CLUSTER FILE SYSTEM

CROSS-REFERENCE TO RELATED APPLICATIONS

This application is a continuation of commonly assigned U.S. patent application Ser. No. 11/776,092, filed Jul. 11, 2007, which is hereby incorporated herein by reference.

FIELD OF THE INVENTION

The present invention relates generally to distributed file systems and, more particularly, to systems and methods for efficiently updating a single directory from multiple nodes in a cluster file system.

BACKGROUND OF THE INVENTION

Advances in communication technology have allowed numbers of machines to be aggregated into computing clusters of great processing power and storage capacity that can be used to solve much larger problems than could a single machine. Because clusters are composed of independent and effectively redundant computers, they have a potential for fault-tolerance. This makes them suitable for other classes of problems in which reliability is paramount. As a result, there has been a great interest in clustering technology in the past several years.

Cluster file systems found in the arts include IBM's General Parallel File System (GPFS). GPFS is a parallel, shared-disk file system for cluster computers available on the RS/6000 SP parallel supercomputer and on Linux clusters that provides, as closely as possible the behavior of a general-purpose POSIX file system running on a single machine.

One drawback of clusters is that programs must be partitioned to run on multiple machines. It can be difficult for these partitioned programs to cooperate or share resources. Perhaps one of the most important resource is the file system. In the absence of a cluster file system, individual components of a partitioned program share cluster storage in an ad-hoc manner. This can complicate programming, limit performance, and compromise reliability.

Some cluster file systems allow client nodes direct access to metadata, such as directories and file attributes stored on data servers alongside the file data (distributed metadata), and use a distributed locking protocol to synchronize updates to these metadata. Other systems, such as SAN-FS, Lustre and P-NFS, use one or more dedicated metadata server nodes to handle metadata.

Traditional supercomputing applications, when run on a cluster, require parallel access from multiple nodes within a file shared across the cluster. Other applications, including scalable file and web servers and large digital libraries, are often characterized by interfile parallel access. In the latter class of applications, data in individual files is not necessarily accessed in parallel. But since the files reside in common directories and allocate space on the same disks, file system data structures (metadata) are still accessed in parallel. In large computing systems, even administrative actions such as adding or removing disks from a file system or rebalancing files across disks, can involve a great amount of work.

The advantage of a cluster file system over a traditional file server is that by distributing data over many data servers, higher aggregate data throughput can be provided. Cluster file systems that use a dedicated metadata server often provide little advantage when it comes to metadata operations such as file creates and deletes, since these operations are usually handled by a single metadata server.

By allowing all client nodes to create or delete files in parallel, cluster file systems with distributed metadata exploit parallelism to achieve higher metadata throughput. However, whenever two nodes create or delete files in the same directory, these updates must be properly synchronized to preserve file system consistency and to provide correct file system semantics. This limits parallelism and negates the advantage of distributed metadata when many nodes are updating the same directory. It is not uncommon for a parallel application to have each node create one or more working files in the same directory when the job starts up. The resulting lock conflicts can serialize all of these updates and require synchronous I/Os to commit and flush each update back to disk before the next node can lock the block. Due to these additional synchronous I/Os, a set of create operations from multiple nodes takes longer to complete than a single node creating the same number of files.

There exists a need to overcome the problems discussed above, and, more particularly, to avoid conflicts on directory blocks while still allowing the bulk of a file create or delete operation to be performed independently and in parallel by all of the nodes in a cluster file system.

SUMMARY OF THE INVENTION

What is disclosed is a method for efficiently updating a single directory from multiple nodes in a cluster file system. In accordance herewith, each lookup, create, or delete operation only locks the particular name of the file that is the target of the operation thereby allowing different nodes to lookup, create or delete different files within the same directory concurrently, while still providing the necessary synchronization for conflicting directory operations.

In one embodiment, the method involves computing a hash value for a given filename and obtaining a name-based lock using the computed hash value. The name based locking preferably comprising a byte range token computed from the hash value. The token manager is queried. If a new lock token was obtained from the token manager then a RPC is sent to the responsible metanode to retrieve directory entries with names that match the computed hash value. The result of the RPC is cached so that subsequent operations on the same filename can be satisfied locally without additional messages to the responsible metanode. For a create or delete operation the cached directory block is updated in memory. The updating involving either creating a new directory entry in the directory block, or deleting an existing directory entry. For a create operation a RPC is sent to the directory metanode to reserve space in a directory block. A new file can be created in a directory by allocating and initializing a new file system object and inserting an entry referring to the file system object in the directory block at the reserved space. Periodically, or when the name based lock token is revoked, a record of all updates to the directory block is sent to the metanode, which then updates the directory block on disk.

When the metanode determines that there is no more room in a directory block to reserve space for a new file create request, the metanode acquires a byte range lock for a range that covers all hash values of names that would be stored in that block. This will revoke byte range tokens from all nodes that have pending updates to that directory block thereby causing these updates to be sent to the metanode. Once the metanode has received these updates, it allocates a new directory block and moves some of the existing directory entries into the new block thereby making room for new entries in the existing block.

In another embodiment, the method switches dynamically between fine-grain hash-based locking and whole directory locking, based on current workload. Each node in the cluster keeps statistics about recent directory operations. When a hash-based directory lock token is requested, the token manager periodically collects statistics from other nodes in the cluster. If there was no recent directory activity on other nodes, the token manager granting a byte range token for a range that covers all possible hash values (zero to $2^{64}-1$ for a 64 bit hash values) instead of a 1-byte range. This allows the requesting node to access all directory blocks directly and performs all updates locally without requiring RPCs being sent to the metanode.

In another embodiment, instead of a single metanode granting reservations for new directory entries and handling updates to all blocks within a single directory, different directory blocks are assigned to different nodes. In order to distribute a load for handling reservations and directory block updates over n nodes, the range of possible hash values is divided into n separate ranges and each range is assigned to a different one of the n nodes.

In another embodiment, the token manager load is distributed to manage byte-range tokens over multiple nodes by assigning different sub-ranges of hash values to different token server nodes.

In yet another embodiment, name-based locking of individual directory entries is applied to other directory representations, such as B-trees, and other data structures which may not utilize hashing. Locking names in another directory organization is an alternative to hash values based on names.

The invention will next be described in connection with certain illustrated embodiments. It should be understood that various changes and modifications can be made by those skilled in the art without departing from the spirit or scope of the invention.

BRIEF DESCRIPTION OF THE DRAWINGS

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

Figure 1:
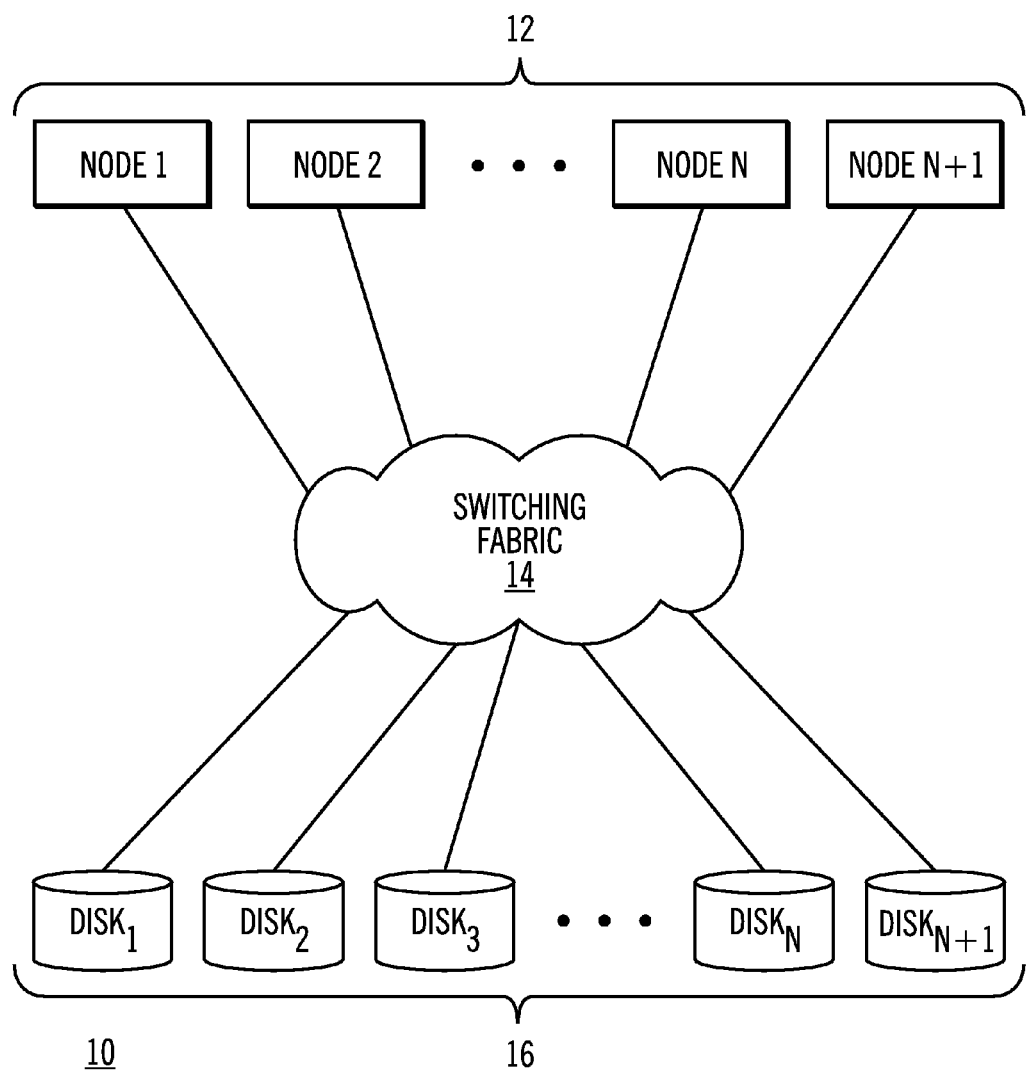
FIG. 1 illustrates the shared disk architecture of a clustered file system upon which the novel features of the present invention will find their intended uses.

What is disclosed is a method for efficiently updating a single directory from multiple nodes in a cluster file system. In accordance herewith, each lookup, create, or delete operation only locks the particular name of the file that is the target of the operation thereby allowing different nodes to lookup, create or delete different files within the same directory concurrently, while still providing the necessary synchronization for conflicting directory operations.

One skilled in this art would be readily familiar with the concepts inherent in parallel file systems and those associated with parallelism in the file/data sharing context. In addition, one would be skilled in the art of computer programming as it relates to nodes, locking, lock tokens, and the like, in a clustered file system environment.

For purposes hereof, a machine readable medium is an article of manufacture such as a floppy disk, a high capacity read-only memory, an optically readable compact disc or CDROM or DVD, a tape, a transmission type media such as a digital or analog communications link, or the like commonly found in the arts.

The following paper entitled: *GPFS: A Shared-Disk File System for Large Computing Clusters*, by Frank Schmuck and Roger Haskin, Proceedings of the Conference on File and Storage Technologies, 231-244 (January 2002) is incorporated herein in its entirety by reference.

In order to better understand the description of the embodiments of the invention described, a brief outline of some terms used herein is provided.

A file is a named data object comprising a string of bits which can be accessed by a computer application. A file has certain attributes, such as length, modification time, and time of last access, to name a few.

Metadata is defined as control structures created by the file system software to describe the structure of a file and the use of the disks which contain the file system. Specific types of metadata which apply to file systems of this type include: inode, directories, allocation maps, and logs. An inode contains the attributes of the file plus a series of pointers to areas of disk which contain the data which makes up this file. An inode may be supplemented by indirect blocks which supplement the inode with additional pointers if the file is large. A directory is a control structure which associates a name with a set of data represented by an inode. Allocation maps are control structures which indicate whether specific areas of the disk or other control structures, such as inodes, are in use or available. This allows software to effectively assign available blocks and inodes to new files. Logs represent records used to keep the other types of metadata in sync in the case of failures. It contains single records which describe related updates to multiple structures.

A file structure is the organization of data objects on a disk. In addition to the file data itself, the file structure typically also contains metadata: a directory that maps filenames to the corresponding files, file metadata that contains information about the file, and the location of the file data on disk (i.e., which disk blocks hold the file data). This includes an allocation map that records which disk blocks are currently in use to store metadata and file data, and a superblock that contains overall information about the file structure (e.g., the locations of the directory, allocation map, and other metadata structures).

A file system is a computer program that allows other application programs to store and retrieve data on media such as disk drives. A software component manages a defined set of disks providing access to data in ways prescribed by the set of Xopen and POSIX standards related to file data. The term file system also describes the set of data and metadata contained within a specific set of disks. For brevity, the sequential discussion herein will use the term disk, but the concepts apply to any similar block structured storage media. The file system allows application programs to create files and give them names, to store (or write) data into them, to read data from them, to delete them, and perform other operations on them.

A shared disk file system is one in which a file structure residing on one or more disks is accessed by multiple file systems running on separate computers. All of the computers are peers in that any may perform any role required to manage the data. Specific roles as nodes may be assigned to specific computers as needed. A shared disk attachment is a method of attaching disks to multiple computers with a protocol that makes the disks appear to be locally attached to each file system. The exact attachment protocol to each computer is not important but includes various forms of network attached disks, switched disk attachment, or store and forward attachment. The key items are that it appears local to the file system and appears the same to all instances of the file system.

A cluster of nodes, on which the file system and the applications that use it run, connect to the disks or disk subsystems over a switching fabric wherein the nodes in the cluster have access to all disks. File system code manages reads and writes requested by applications. This management uses the application requests and metadata to create access data within the file system. This function is the bulk of the processing and is often identical on all computers in the cluster.

Generally, the cluster system assumes a conventional block I/O interface with no particular intelligence at the disks. It is assumed herein that the computers (or nodes) have no shared memory even though they could and in many likely implementations would have a local memory and at least some shared memory, and that they are connected to the disks on which the file structure resides by some means such as a bus or a switching network or some other communication network. It is assumed that the nodes communicate with each other by similar means. One skilled in this art would appreciate that this communication is structured using a technique called remote procedure calls (RPC) that is common in this art.

In a cluster file system, large files are typically divided into equal sized blocks and consecutive blocks are usually placed on different disks in a round-robin fashion. To minimize overhead, the block size is large. Large blocks allow a large amount of data to be retrieved in a single I/O from each disk. Small files and the end of large files can be stored in smaller units called fragments.

Attention is directed to FIG. 1 which illustrates the shared disk architecture 10 of a clustered file system upon which this invention will find its intended uses. The clustered file system of FIG. 1 generally consists of a cluster of computers (nodes), collectively at 12, on which applications run. These nodes are in communication with a plurality of disks or disk subsystems, collectively at 16, over a switching fabric 14. All nodes in the cluster typically have access to all disks.

The switching fabric that connects file system nodes to disks may consist of a storage area network (SAN), (e.g., fiber channel or iSCSI). Alternatively, individual disks may be attached to some number of I/O server nodes that allow access from file system nodes through a software layer running over a general-purpose communication network.

The shared disk implementation of FIG. 1 provides the shortest available path for moving the data from the disk to/from the using application. There is no file system server in the path for either data or metadata. Any available path can be used avoiding a bottleneck or single point of failure.

In order to better understand the invention, a general description of pertinent aspects of a parallel file system is provided herein. It should be understood that this is provided to give the unfamiliar reader a basic understanding of this subject matter to which the invention pertains. One skilled in this art would appreciate the simplicity while recognizing that a more thorough understanding of this subject matter requires a more comprehensive study. A series of patents to Schmuck et al. describe various aspects of a shared parallel disk file system, including: U.S. Pat. Nos. 5,893,086; 5,940,838; 5,950,199 5,963,963; 5,974,424, 5,987,477; 5,999,976; 6,021,508; 6,023,706; 6,032,216, 6,954,881, 7,120,650, and 7,216,135, each of which is incorporated herein by reference in their entirety.

File systems generally comprise a plurality of directories with individual filename entries. For a file to be retrieved or created, a filename must be either found in the directory if it exists or added to the directory if it does not exist. Large file systems can have very large directories containing millions of individual files each having their own filename. In order to support efficient filename lookup in very large directories, extensible hashing is often used to organize a plurality of directory entries within a directory. Extensible hashing is an advance over the standard hashing techniques which require that the maximum number of hash buckets be know from the start. Extensible hashing solves this problem by using a variable number of bits from the value of the hash function.

For directories that occupy more than one disk block, the block containing the directory entry for a particular name can be found by applying a hash function to the filename and using the n low-order bits of the hash value as the directory block number, where n depends on the size of the directory. As a directory grows, extensible hashing adds new directory blocks one at a time. When a create operation finds no more room in the directory block designated by the hash value of the new filename, it splits the directory block in two. When a directory block is split, a new directory block is added and some of the directory entries are moved from the existing directory block into the new one. Which entries are moved is determined by re-evaluating the hash function and using one more bit to determine the directory block number: entries where the additional bit is zero stay in the existing directory block, those with a one value for the additional bit are moved to the new directory block. The logical block number of the new directory block is derived from the old block number by adding a '1' in the n+1 bit position, and directory entries with a '1' in the n+1 bit of their hash value are moved to the new block. Other directory blocks remain unchanged.

In a file system, data written to a regular file is often stored in one or more disk blocks on disk. Xopen and POSIX standards allow writing new data past the current end of a file. This allows creating files with gaps or "holes", i.e., areas within a file to which no data was ever written. Such files are often referred to as sparse files. File system implementations that support sparse files efficiently can avoid allocating disk blocks corresponding to these holes.

A large directory based on extensible hashing can be represented as a sparse file with holes in the file representing directory blocks that have not yet been split. By checking for sparse regions in the directory file, it can be determined how often a directory block has been split and thus how many bits of the hash value to use in order to locate the directory block containing a given filename. A lookup operation requires only a single directory block access regardless of the size and structure of the directory file.

A cluster file system allows scaling I/O throughput beyond what a single node can achieve. Preserving file system consistency and POSIX semantics requires synchronizing access to data and metadata from multiple nodes. Synchronization can be achieved by distributed locking. Distributed locking allows greater parallelism than centralized management as long as different nodes operate on different pieces of data/metadata.

A distributed lock manager uses a centralized global lock token manager running on one of the nodes in the cluster in conjunction with local lock managers in each file system node. The global lock manager coordinates locks between local lock managers by handing out lock tokens which convey the right to grant distributed locks without the need for a separate message exchange each time a lock is acquired or released.

Repeated accesses to the same disk object from the same node only require a single message to obtain the right to acquire a lock on the object (the lock token). Once a node has obtained the lock token from the token manager or 'token server', subsequent operations issued on the same node can acquire a lock token on the same object without requiring additional messages. Only when an operation on another node requires a conflicting lock token on the same object are additional messages necessary to revoke the lock token from the first node so it can be granted to the other node. Lock tokens also play a role in maintaining cache consistency between nodes. When lock conflicts are frequent, the overhead for distributed locking may exceed the cost of forwarding requests to a central node. In which case, data or metadata that is frequently accessed and updated from different nodes can be better managed by a more centralized approach wherein all conflicting operations are forwarded to a designated node which performs the request read or update operations.

Byte-range locking is used to synchronize reads and write to file data. This allows parallel applications to write concurrently to different parts of the same file, while maintaining POSIX read/write atomicity semantics.

When a process needs to lock a byte range, it first needs to acquire an appropriate byte range lock token. The byte range lock token represents the node's access rights to a portion of a file. Thus, if a node holds a byte range token for file X for range (100,200) in read mode, it means that the node may safely read that portion of the file. After the read has completed, the token can be safely unlocked. One skilled in this art would appreciate that byte range lock tokens represent a specialized version of lock tokens managed using the distributed lock token manager previously described.

A metanode manages file metadata for parallel read and write in the shared-disk environment. Although nodes may read and write to different areas of the file if they present an appropriate lock on the sections when they are reading or writing, they all need to access the same metadata. By regulating access to the metadata, the metanode synchronizes read/write operations so that a consistent view of the file will be available from all nodes.

A single node is appointed for each file which is responsible for accessing and updating the file's metadata. The metanode for a particular file is elected dynamically with the help of the token manager or token server. The metanode is responsible for handling the I/O activity of the metadata from and to the disk (or disks) on which the metadata reside. All the other nodes communicate with the metanode in order to fetch or update metadata information. These nodes do not access the metadata information on the disk directly. Nodes access the metanode for metadata. The metanode prevents a considerable amount of disk activity.

When a node first accesses a file, it tries to acquire the metanode token for the file from the token manager. The token is granted to the first node to do so. Other nodes instead learn the identity of the metanode. Thus, in traditional workloads without concurrent file sharing, each node becomes metanode for the files it uses and handles all metadata updates locally. When a file is no longer being accessed on the metanode and ages out of the cache on that node, the node relinquishes its metanode token and stops acting as metanode. When it subsequently receives a metadata request from another node, it sends a negative reply. The other node will then attempt to take over as metanode by acquiring the metanode token. The metanode for a file tends to stay within the set of nodes actively accessing the file.

The metanode keeps a cached copy of the metadata which reflects the metadata on disk. Other nodes also keep a cached copy of the metadata which they read in the past from the metanode, and which they augment as needed. Each metadata element has its own pattern of usage and special characteristics.

The metanode keeps the information about the file's metadata and acts as a smart cache between the disk and all the nodes that access the file. There are situations when the metanode ceases to serve this function. In order to enable smooth operation and recovery, these situations need to be handled. Nodes that used to access the metanode need to elect a new metanode in a straight forward way. The election process takes into account the access patterns of the file. In one embodiment, there is only one metanode per file.

In a large file system, it is not feasible to run a file system check (fsck) to verify/restore file system consistency each time the file system is mounted or every time that one of the nodes in a cluster goes down. Instead, all metadata updates that affect file system consistency are recorded in a journal or write-ahead log.

Each node has a separate log for each file system it mounts. The log is stored in that file system. Because this log can be read by all other nodes, any node can perform recovery on behalf of a failed node. It is not necessary to wait for the failed node to come back to life. After a failure of a node, file system consistency can be restored quickly by simply reapplying updates recorded in the failed node's log. For example, creating a new file requires updating a directory block as well as the inode of the new file. After acquiring locks on the directory block and the inode, both are updated in the buffer cache, and log records are spooled that describe both updates. Before the modified inode or directory block are allowed to be written back to disk, the corresponding log records must be forced to disk. Thus, if the node fails after writing the directory block but before the inode is written to disk, the node's log is guaranteed to redo the missing inode update. Once the updates described by a log record have been written back to disk, the log record is no longer needed and can be discarded. Logs can be fixed size because space in the log can be freed at any time by flushing dirty metadata back to disk in the background.

After log recovery completes, other nodes can acquire any metanode tokens that had been held by the failed node and thus take over the role of metanode. If another node had sent metadata updates to the old metanode but, at the time of the failure, had not yet received an acknowledgment that the updates were committed to disk, it re-sends the updates to the new metanode. These updates can be re-applied by the new metanode.

Directory entries can be assigned to directory blocks and directory updates can be synchronized by locking the directory block being updated. Although this allows updating different directory blocks concurrently, there may be many more nodes updating the directory than there are directory blocks. Since extensible hashing assigns filenames to blocks in a fixed way for directories of a given size, a parallel create in a large cluster can result in on the order of 100 or more different nodes trying to update the same directory block at the same time. This can result in severe performance degradation due to lock conflicts.

A preferred embodiment provided herein avoids lock conflicts on directory blocks while still allowing the bulk of a filename create or delete operation to be performed independently and in parallel by all of the nodes in the cluster file system.

Instead of locking physical directory blocks, each lookup, create, or delete operation only locks the particular filename that is the target of the operation thereby allowing different nodes to lookup, create or delete different files within the same directory concurrently, while still providing the necessary synchronization for conflicting directory operations (two nodes trying to create or delete the same file).

A create or delete (unlink) system call on a Unix-type operating system (e.g., AIX, or Linux) results in two calls from the logical file system layer to the underlying physical file system in the kernel: a lookup to check whether the specified filename already exists followed by the actual create or delete operation.

Figure 2:
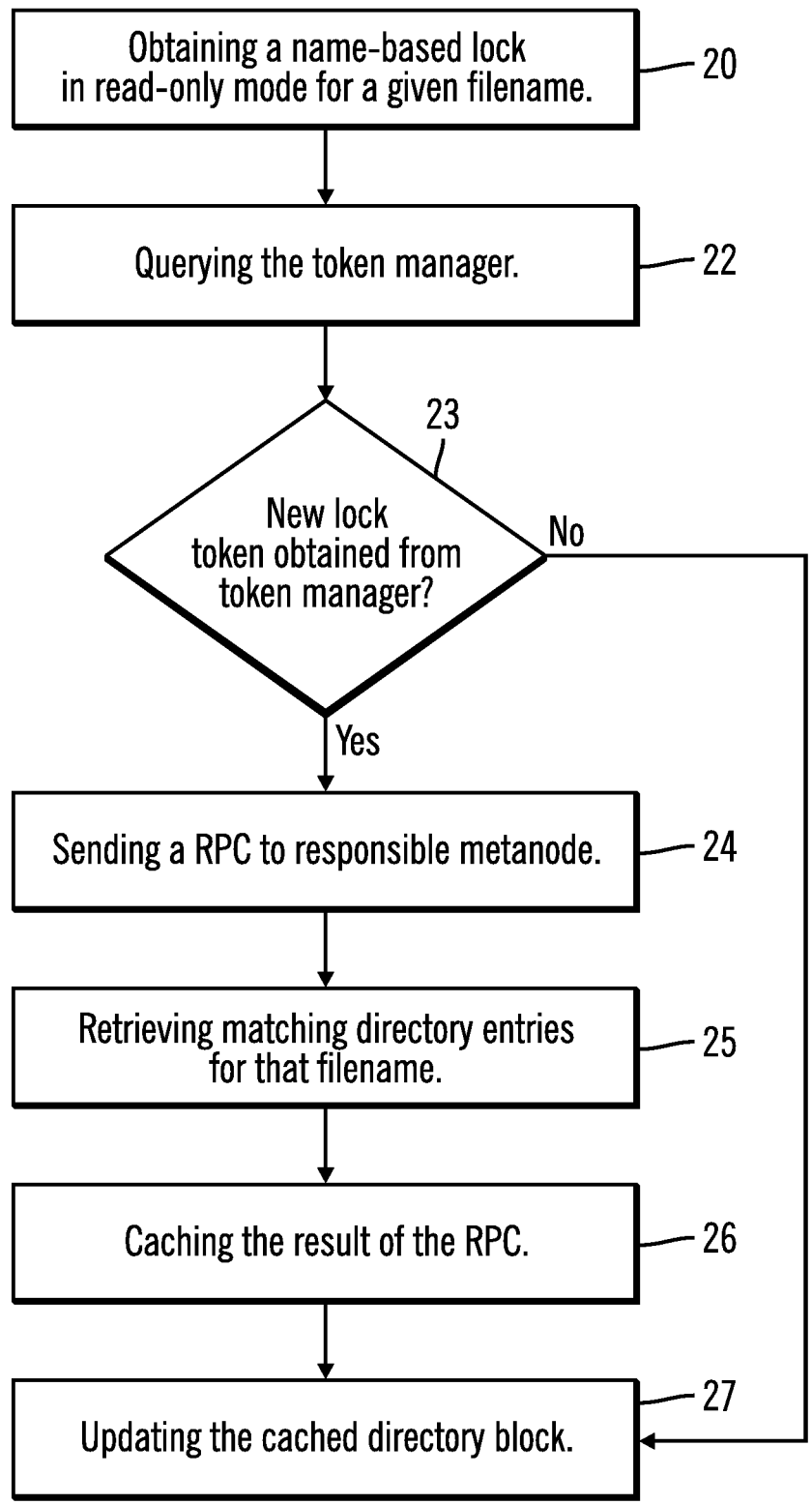
FIG. 2 is a flow diagram of one embodiment of the present invention.

Attention is directed to FIG. 2 illustrating a flow diagram of one embodiment of the present invention.

At 20, the lookup involves first obtaining a name-based lock in read-only mode for the given filename. For efficiency, in order to avoid requiring the lock manager to deal with variable length names as lock keys and in order to leverage existing byte-range locking infrastructure, locking a filename is implemented in one embodiment by computing a 64-bit hash value of the filename. The name based lock is represented as a byte-range lock on a range that starts at an offset derived from the computed hash value and is one byte long. The start offset is calculated by reversing the bits in the computed hash value. Since extendible hashing uses the last n-bits of the hash value to assign names to directory blocks reversing bits to calculate a byte range start offset ensures that the byte ranges for file names assigned to the same directory block fall within a single contiguous range of offsets. This allows obtaining a lock on all names that might be stored in a particular directory block by obtaining a single, larger byte range lock that spans all these offsets.

At 22, the token manager is queried. If a new lock token was obtained 23 from the token manager then, at 24, sending a Remote Procedure Call (RPC) to the responsible metanode. At 25, directory entries with names that match the computed hash value for that filename are retrieved. At 26 caching the result of the RPC so that subsequent operations on a same filename can be satisfied locally without additional messages sent to the responsible metanode. This is preferably done by inserting directory entries received from the metanode into the cache directory block and removing matching entries that are not contained in the metanode's reply. In such a manner, cached directory entries are guaranteed to be valid as long as a node is holding a lock token for the corresponding hash value of the filename. At 27, updating the cached directory block in memory. Updating the directory block involves either creating a new directory entry in the directory block or deleting the directory entry.

Figure 3:
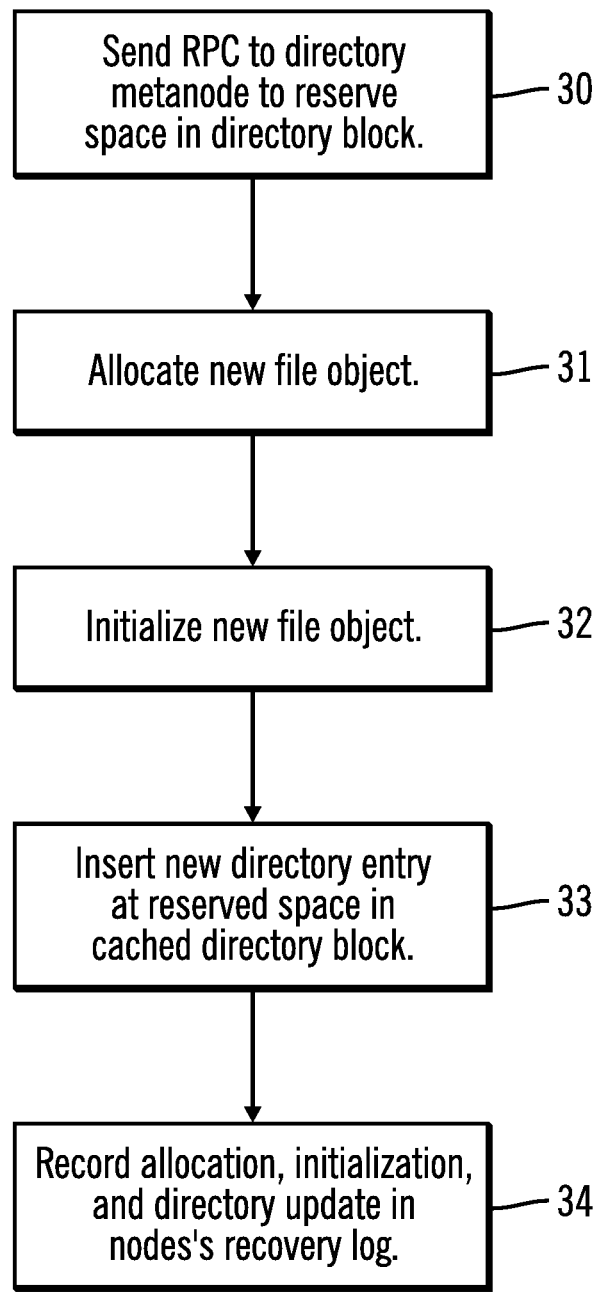
FIG. 3 is a flow diagram of one embodiment of the create operation of the updating block of FIG. 2.

Reference is now being made to FIG. 3 which is a flow diagram of one embodiment of the create operation of the updating block 27 of FIG. 2. The create operation involves, at 30 sending a RPC to the directory metanode to reserve space in the directory block. At 31, allocating a new file object (inode). At 32, the new file object is initialized in memory. At 33, a new directory entry is inserted at the reserved location in the cached directory block. At 34, information about the allocation, initialization and updating are recorded in the node's recovery log. These log records are spooled.

Figure 4:
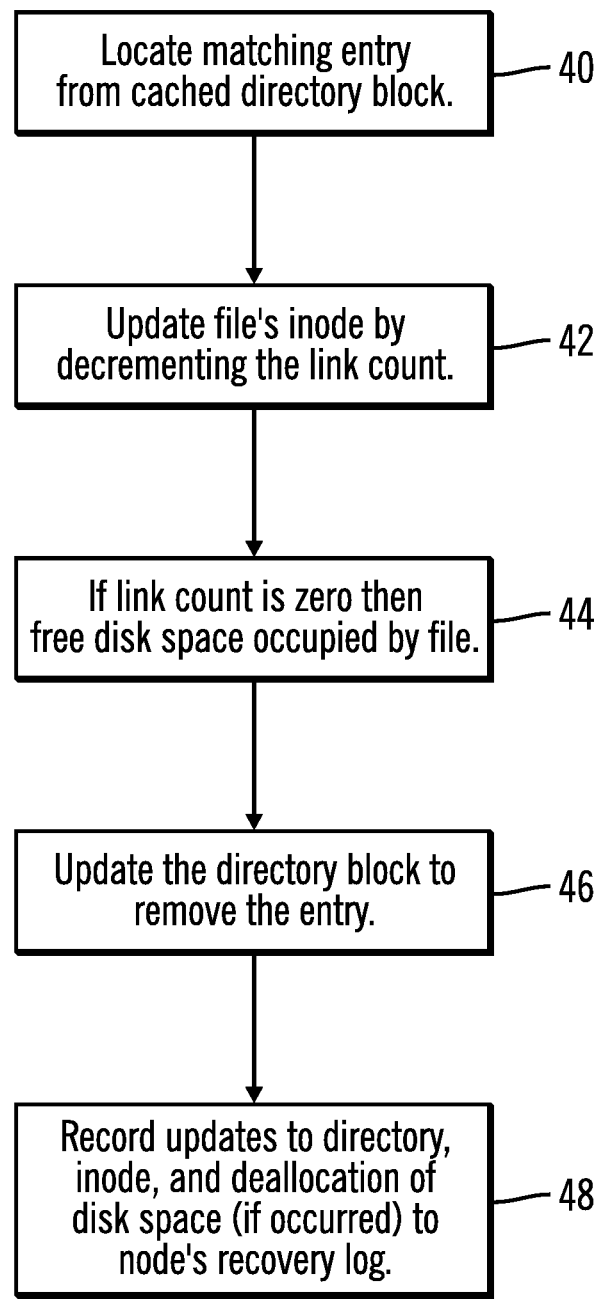
FIG. 4 is a flow diagram of one embodiment of the delete operation of the updating block of FIG. 2.

Reference is now being made to FIG. 4 which is a flow diagram of one embodiment of the delete operation of the updating block 27 of FIG. 2. At 40, locating a matching directory entry from the cached directory block. At 42, the link count in the file's inode is decremented. At 44, if the link count for that matching directory entry is zero, the disk space occupied by the file is freed (deallocated). The inode is preferably also freed. At 46, the directory block is updated by removing the entry. At 48, the directory update and the inode update and any deallocation are recorded in the node's recovery log. These log records are spooled.

The content of new directory entries created at 33 of FIG. 3 and information about directory entries deleted at 46 in FIG. 4 are sent to the metanode. This information is provided to the metanode either periodically, or on a subsequent synchronization event, or when the name based lock token is revoked. Upon receiving this information, the metanode then updates the directory block on disk.

When the metanode determines that there is no more room in a directory block to reserve space for a new file create request, the metanode acquires lock for a range that covers all hash values of names that would be stored in that directory block. This will revoke byte range lock tokens from all nodes that have pending updates to that directory block thereby causing these updates to be sent to the metanode. Once the metanode has received these updates, it allocates a new directory block and moves some of the existing directory entries into the new block thereby making room for new entries in the existing directory block.

In another embodiment, the method switches dynamically between fine-grain hash-based locking and whole directory locking, based on current workload. Each node in the cluster keeps statistics about recent directory operations. When a hash-based directory lock token is requested, the lock manager periodically collects statistics from other nodes in the cluster. If there was no recent directory activity on other nodes, the lock manager granting a byte range token for a range that covers all possible hash values (zero to 2^64-1 for a 64 bit hash values) instead of a 1-byte range. This allows the requesting node to access all directory blocks directly and performs all updates locally without requiring RPCs being sent to the metanode.

A bit reversing technique is preferably implemented which makes addressing of blocks of names possible. In this technique, the hash value that is used by extensible hashing to assign names to directory blocks is also used in the byte range lock offset. In extensible hashing, the low bits are used but, in order to preserve adjacency of byte ranges, the hash is reversed so that high bits of the byte range offset indicate the block in which corresponding names reside. A superset of the hash bits are used in the byte range offset than are used for selecting the directory block.

In another embodiment, instead of a single metanode granting reservations for new directory entries and handling updates to all blocks within a single directory, different directory blocks are assigned to different nodes. In order to distribute a load for handling reservations and directory block updates over n nodes, the range of possible hash values is divided into n separate ranges and each range is assigned to a different one of the n nodes.

In another embodiment, the token manager load is distributed to manage byte-range tokens over multiple nodes by assigning different sub-ranges of hash values to different token server nodes.

In yet another embodiment, name-based locking of individual directory entries is applied to other directory representations, such as B-trees, and other data structures which may not utilize hashing. Locking names in another directory organization is an alternative to hash values based on names.

In summary, what has been disclosed herein is a method for efficiently updating a single directory from multiple nodes in a cluster file system wherein each lookup, create, or delete operation only locks the particular name of the file that is the target of the operation. The invention advantageously allows different nodes to operate within the same directory concurrently while still providing the necessary synchronization for conflicting directory operations.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A method for avoiding directory conflicts across a file system having multiple nodes, comprising:
    assigning, for each directory in a file system having multiple directories and multiple nodes each accessing each of the multiple directories in parallel and at least one node of said multiple nodes representing a token manager node, at least one node of said multiple nodes to act as a metanode responsible for collecting updates to a particular directory of said multiple directories and for writing updates to directory blocks of said particular directory on disk;
    obtaining, by a particular node of said multiple nodes, a name-based lock on a filename within said particular directory that is the target of an operation by said particular node, wherein other nodes of said multiple nodes concurrently perform operations on other files within said particular directory, wherein said name-based lock is represented by a byte-range lock for a range of selected bytes of said particular directory determined from a computed hash value of said filename within a total range of bytes for said particular directory;
    querying, by said particular node, said token manager for a name-based lock token for said range of selected bytes acquired under said name-based lock;
    if a new name-based lock token is obtained from said token manager, sending a Remote Procedure Call (RPC) to said metanode to obtain matching directory entries for at least one directory block matching said computed hash value of said filename from among said directory blocks of said particular directory;
    caching, by said particular node, said result of said RPC by inserting at least one directory entry for said at least one directory block received from said metanode in said result of said RPC into a cached directo block of said particular node and removing at least one other entry from said cached directory block not contained in said result of said RPC so that subsequent operations on said filename can be satisfied using said cached directory block without additional messages sent to said metanode, wherein said cached directory block is valid while said particular node holds said name-based lock token for said filename; and
    updating, by said particular node for said operation, said cached directory block in memory by either creating a new directory entry in said cached directory block for a create operation or deleting an existing directory entry from said cached directory block for a delete operation.

2. The method as in claim 1, said creating a new directory entry in said cached directory block for a create operation comprising:
    sending, by said particular node, a new RPC to said metanode to reserve space in said at least one directory block;
    responsive to said particular node receiving a result of said RPC from said metanode with said reserved space, allocating and initializing a new file system object;
    inserting into said reserved space of said cached directory block said new directory entry comprising said filename and a reference which points to said allocated new file system object;
    recording information about said allocating, initializing, and inserting in a recovery log of said particular node; and
    sending said information to said metanode, wherein said metanode updates said particular directory block on disk to reflect said information about said cached directory block.

3. The method as in claim 1, said deleting said existing directory entry from said cached directory block comprising:
    locating a matching directory entry matching a particular directory entry specified in said delete operation in said cached directory block;
    decrementing a link count in an inode containing attributes of said file referred to by said filename in said matching directory entry;
    responsive to said link count decrementing to zero, freeing a portion of disk space occupied by a file system object for said file and freeing said inode;
    updating said cached directory block by removing said matching directory entry from said cached directory block;
    recording information about said locating, decrementing, freeing, and updating in a recovery log of said particular node;
    sending said information to said metanode, wherein said metanode updates said particular directory block on disk to reflects said information about said cached directory block.

4. The method as in claim 1, further comprising:
    sending information from said particular node regarding said updating of said cached directory block to said metanode on one of: periodic schedule, a subsequent synchronization event, or when said name-based lock token is revoked.

5. The method as in claim 2, further comprising:
    responsive to said metanode detecting there is insufficient space left to reserve in said directory block, said metanode acquiring a name-based range lock for a range of filenames that covers all filenames that might be found in said directory block, revoking all name-based lock tokens corresponding to said filenames that have been previously requested from said token manager by said multiple nodes, triggering said nodes with pending updates to said directory block to send said updates to said metanode, and responsive to said metanode receiving said updates, allocating a new directory block and extending the directory block to make room for more entries by moving a selection of directory entries in the directory block to the new directory block.

6. The method as in claim 1, further comprising switching dynamically between name-based locking based on a hash value for a particular file name and directory block locking based on a range of hash values of a plurality of possible file names stored in a directory block.

7. The method as in claim 6, wherein switching dynamically between name-based locking and directory block locking further comprises:

when a said name-based lock token is requested for the particular directory by said particular node, collecting, by said token manager, statistics about recent directory operations from each of said multiple nodes, wherein each of said multiple nodes maintains separate statistics about recent directory operations;

if said token manager detects from said collected statistics that there was no recent directory activity for the particular directory on other nodes in said file system, granting, by said token manager, said name-based lock token in directory block locking covering said range of hash values of said plurality of possible filenames for said directory blocks of said particular directory instead of a 1 byte range only covering a minimum range of hash value of said particular file name only; and after obtaining said name-based lock covering said range of hash values of said plurality of possible filenames in said particular directory, said particular node accessing said directory blocks directly and updating said directory blocks locally without requiring any additional communication to said metanode instead of requiring and additional RPC to said metanode to access or update said at least one directory block if only said minimum range of hash value of said particular file name only is granted.

8. The method as in claim 1, said name-based locking comprising:

computing said hash value for said filename; and utilizing said hash value to obtain said named-based lock.

9. The method as in claim 1, assigning different nodes of said multiple nodes in said file system to handle different directory blocks within said particular directory.

10. The method as in claim 1, further comprising distributing a workload of said token manager by assigning sub-ranges of filenames to other nodes from among the multiple nodes in said file system.

* * * * *